(No Model.)
J. C. WILSON.
LACING BEARING.
No. 343,146. Patented June 1, 1886.
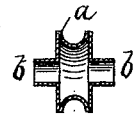
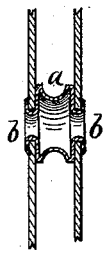
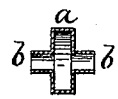
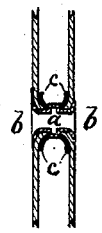
Attest.
R. F. Osgood.
P. H. Costich
E. V. Adams
Inventor.
Joseph C. Wilson.

UNITED STATES PATENT OFFICE.

JOSEPH C. WILSON, OF ROCHESTER, NEW YORK, ASSIGNOR OF ONE-HALF, BY DIRECT AND MESNE ASSIGNMENTS, TO ESTHER R. SPENCER AND HOBART F. ATKINSON, BOTH OF SAME PLACE.

LACING-BEARING.

SPECIFICATION forming part of Letters Patent No. 343,146, dated June 1, 1886.

Application filed October 19, 1885. Serial No. 180,286. (No model.)

*To all whom it may concern:*

Be it known that I, JOSEPH C. WILSON, of the city of Rochester, in the county of Monroe and State of New York, have invented a certain new and useful Improvement in Lacing-Bearings; and I do hereby declare that the following is a full, clear, and exact description of the same, reference being had to the drawings accompanying this application.

My improvement relates to that class of bearings in corsets, gloves, shoes, &c., in which the bearing proper, or that portion around which the cord passes, is circular in cross-section and is enlarged over the end portions which fasten to the fabric.

The object of my invention is to make the device in the form of an eyelet, which can be secured in place by nipping up at the ends, as ordinary eyelets are, to secure them, but still leave the central portion enlarged and of circular form for the cord to pass around, all as hereinafter described.

In the drawings, Figure 1 is a longitudinal section of the bearing. Fig. 2 is a similar view of the same attached to the fabric. Fig. 3 is a view similar to Fig. 1, but showing a modification. Fig. 4 is a view similar to Fig. 2, but also showing a modification.

This bearing is made of thin metal and hollow, and consists of the central enlarged circular portion, *a*, which forms the bearing proper, around which the cord passes, and two cylindrical end extensions, *b b*, of smaller size, that form the eyelet portions, which are nipped up or expanded to hold on the fabric in the usual way. The central or hub portion rests between the side edges of the fabric, while the extensions are turned over so as to embrace the edges of the fabric and clamp them against the shoulders of the hub. The hub may be grooved in pulley form, as shown in Fig. 1, or be made cylindrical, as in Fig. 3, or of any other desired form to suit the cord that passes around the same. In some instances, and in very small bearings, washers *c c* are used, fitting next to the hub, in order to form large shoulders, as shown in Fig. 4.

I do not wish to confine myself simply to bearings for corsets, gloves, shoes, &c., as my invention is applicable to other uses, and the bearings can be made of larger sizes and be adapted to uses with cords of larger size than lacing-cords.

The great advantage of this invention is, that it has an enlarged central cord-bearing and eyelet ends, that can be readily attached in the ordinary way of attaching eyelets that have no center bearing, and being all made in one piece of tubular form it is very cheap and effective.

Having described my invention, what I claim as new, and desire to secure by Letters Patent, is—

1. The bearing consisting of the enlarged center hub portion, *a*, and end extensions, *b b*, the whole being made hollow, the center portion forming a cord-bearing, and the extensions eyelets, as set forth.

2. The combination of the bearing consisting of the enlarged center portion and tubular end extensions and the washers fitted on the extensions and resting against the center portion, as and for the purpose specified.

In witness whereof I have hereunto signed my name in the presence of two subscribing witnesses.

JOSEPH C. WILSON.

Witnesses:
R. F. OSGOOD,
P. A. COSTICH.